Jan. 30, 1923.
H. C. LORD.
SPRING.
ORIGINAL FILED JULY 8, 1919.
1,443,545
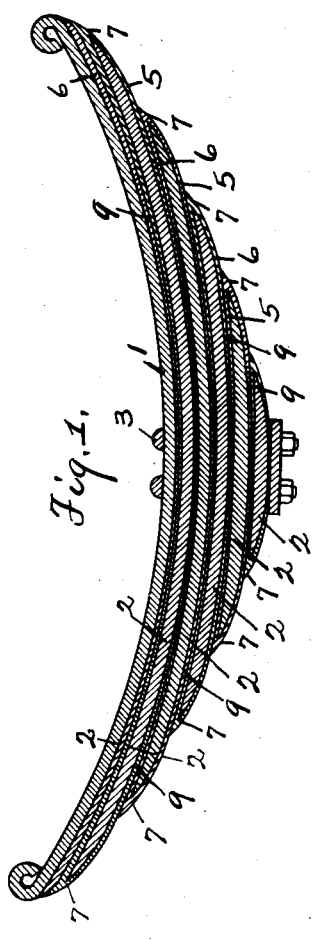
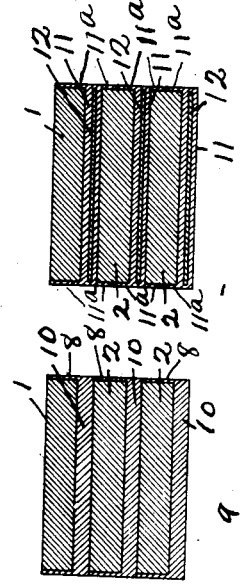
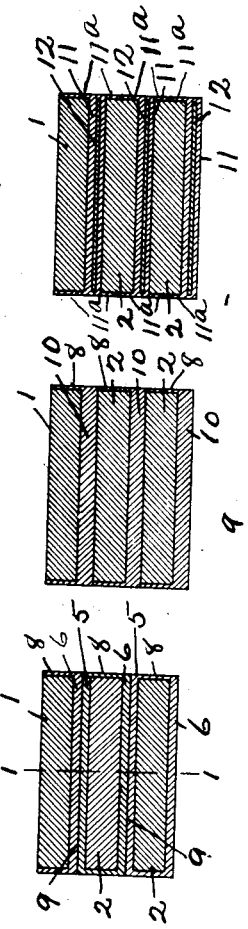
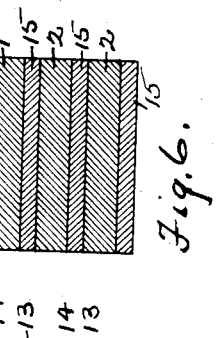
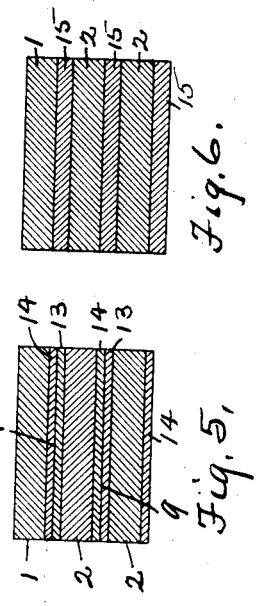
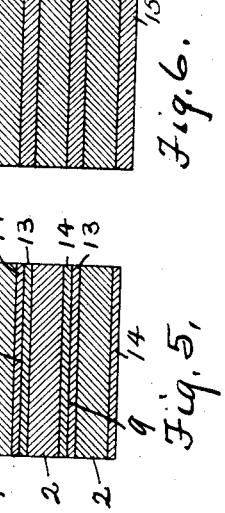
INVENTOR
Hugh C. Lord Patented Jan. 30, 1923.

1,443,545

UNITED STATES PATENT OFFICE.

HUGH C. LORD, OF ERIE, PENNSYLVANIA.

SPRING.

Application filed July 8, 1919, Serial No. 309,312. Renewed April 28, 1922. Serial No. 557,223.

*To all whom it may concern:*

Be it known that I, HUGH C. LORD, a citizen of the United States, residing at Erie, in the county of Erie and State of Pennsylvania, have invented new and useful Improvements in Springs, of which the following is a specification.

The invention is designed to obviate the wear between the leaves of springs, the disagreeable noises created by the leaves one upon the other, and to improve the action of the spring. Further purposes of the invention will appear from the specification and claims.

Broadly stated the invention consists in inserting layers of rubber between the leaves of leaf springs the rubber having a capacity to take up the relative endwise movement of the leaves by the stretching of the rubber. In carrying out the invention in its various forms the shape and thickness of the rubber will be determined by the circumstances. If it is only desired to obviate the disagreeable noises and to make a more perfect bearing for the leaves the thickness of the rubber may be made sufficient to take up this endmovement with very little stretching. Under these conditions the frictional engagement of the rubber itself may secure the rubber sufficiently to the leaves to prevent slipping and wear of the rubber. If, however, the full utilization of the rubber is desired as well as economy in the amount of rubber the thickness of the rubber should be reduced so that the rubber will be stretched by the relative movement of the leaves and thus the strength of the spring will be increased.

Where the leaves are clamped together at some one point so that the relative movement of the leaves is very slight adjacent to the clamp the thickness of the rubber layer is preferably reduced at this point and gradually increases as the relative movement of the leaves increases so that the entire layer of rubber is subjected to the same stress with the flexing of the spring. If, however, the full utilization of the rubber is to be accomplished it will be desirable to make the shorter leaves of the ordinary spring somewhat longer than common because the theoretical stepping up of the leaves where the resiliency of the metal alone is relied upon for the strength of the spring will not fully utilize the elasticity of the rubber.

For some springs it may be desirable to reduce the effect of the resistance of the metal to flexure and increase the relative effect of the rubber through such action. This can be accomplished by decreasing the thickness of the rubber relatively to the relative action of the leaves and so forming the leaves as to reduce their resistance. It will be noted that the action of the rubber as it is subjected to the stretching action through the relative movement of the leaves increases its resistance with increasing increments and in this respect its influence on the spring as a whole is for many purposes preferable to the action of the ordinary spring.

The rubber is preferably securely attached to the opposing faces of the leaves not only to effect the stretching of the rubber and thus to increase the resistance of the spring but also to tie the spring together so as to support the main leaf when the spring is permitted to rebound. It will be noted that in this case the rubber is stretched in a reverse direction and thus resists the further flexing of the spring, thus assisting in overcoming the force of the rebound. If desired, the neutral point of the rubber may be varied from the neutral point of the spring leaves and in this way the rubber may be made to assist more fully in resisting the action as to rebound or to otherwise vary the action of the spring as may be desired. This may be particularly desirable where the rubber is comparatively thin and subjected to considerable stress in that it gives great flexibility near the neutral point with a rapidly increasing resistance in either direction from this point. This change in the characteristic of the spring is also desirable in that while it gives to the spring at the neutral position which may be the load line a frictionless action the rapid change from the neutral position of the spring in either direction reduces the tendency of the spring to teeter.

In placing the rubber on the springs so far as performance is concerned it might be desirable to build up the spring with the metal and rubber leaves alternately and vulcanize the whole mass in one operation but where this is done it would be difficult to replace a broken leaf and consequently it is desirable to have the construction such that the leaves may be separated and one phase of my invention involves a structure which permits this.

The invention is illustrated in the accompanying drawings as follows:—

Fig. 1 shows a central longitudinal section through the spring on the line 1—1 in Fig. 2.

Fig. 2 a section on the line 2—2 in Fig. 1.

Figs. 3, 4, 5 and 6 alternative constructions.

The spring comprises the long leaf 1 and a series of leaves 2 ordinarily arranged in connection with the long leaf, each leaf being slightly shorter than the next adjacent leaf nearer the long leaf. This is an ordinary construction but the invention is not lmited to this variation of length of leaves. In the exemplification shown the leaves are clamped together at the center by a clamp 3. The tops of each of the leaves 2 has a rubber layer 5 preferably extending throughout the surface of the leaf and the bottom surface of each leaf has a layer of rubber 6 preferably extending throughout the surface of the leaf. The layers 5 and 6 preferably extend beyond the leaves at 7 so that the two layers are united around the end of the spring and the layers are preferably united around the sides of the leaves at 8 so that the leaves are entirely encased. Preferably the rubber is of a thickness as hereinbefore described adjacent to the ends of the spring and is of a gradually decreasing thickness on the surface of the leaf as it approaches the clamp so that under the clamp there is a mere film of rubber sufficient to take up any inequalities in the spring surface. This permits the leaves to be fully clamped together at the center and at the same time there is not sufficient compression of rubber to put the leaves under strain through the expanson of the rubber layers outside the clamp.

The rubber is preferably so formed and secured to the leaves as it is vulcanized. This is preferable because it is possible to make the attachment of the rubber to the leaves very secure in ths manner. The process of vulcanizing rubber so as to have it adhere to a metal surface is well-known, one method consisting of treating the surface with sulfuric acid solution so as to cleanse it, coating it sligthly with sulfuric acid and blue vitriol solution and coating with a rubber cement and vulcanizing the layer of rubber in place. Where the preferable construction is used the molds entirely surround the leaf so that the leaf is entirely encased, and the molding is, therefore, simplified. Where each leaf is coated separately and the rubber vulcanized to the leaf as shown in the preferred construction of Figs. 1 and 2 the rubber surfaces of the joining leaves are secured together by rubber cement at 9. While a very substantial union may be accomplished in this way the leaf may be separated at any time by using the usual cement solvents, such as benzine.

An alternative construction is shown in Fig. 3. In this construction the spring is shown as having solid inserts 10 and is a construction resulting from building up the spring by alternate leaves and layers of rubber and vulcanizing the whole en masse. This would make a spring possibly superior in performance to that shown in Figs. 1 and 2 but lacks the advantage of the possibility of easily removing one of the leaves.

In Fig. 4 an insert 11 of rubber is formed and this insert has a thin metal strip 12 at its center. This rubber insert may be made of sufficient thickness to permit of the end-movement of the rubber by the frictional engagement of the leaves on the rubber and the metal strip prevents the creeping of the rubber from beneath the leaves. Each layer may also extend by the edge of the leaf and have a shoulder 11$^a$ to prevent side creeping. It lacks the advantage of utilizing the full elasticity of the rubber as in the structure shown in Figs. 2 and 3 in offering resistance to the movement of the spring and unless the surfaces of the leaves are further secured to the rubber it does not assist the spring in resisting rebound. It does, however, give to the spring leaves a better bearing and does do away with the disagreeable noises incident to a movement of one leaf upon the other.

In Fig. 5 the layers of rubber 13 and 14 are secured to the upper and lower surfaces of the leaves but do not include the side portions 8. With this structure the layers of rubber are preferably vulcanized to the leaves and the rubber surfaces are secured at 9 with rubber cement.

In Fig. 6 the layer between the leaves is an integral strip of rubber 15 preferably secured to the opposing faces of the leaves by vulcanization.

What I claim as new is:—

1. In a spring, the combination of a plurality of leaves free to move endwise relatively to each other; and a rubber insert between adjacent leaves engaging opposing surfaces of the leaves and each surface of the rubber insert moving with the surface of the leaf engaged.

2. In a spring, the combination of a plurality of leaves free to move endwise relatively to each other; and a rubber insert between the leaves, the rubber being stretched by the relative movement of the opposing adjacent surfaces of the leaves and the resilience of the rubber acting with the resilience of the leaves in returning the spring from flexure.

3. In a spring, the combination of a plurality of leaves free to move endwise relatively to each other; and a rubber insert between the leaves, the rubber being stretched by a flexure of the spring and acting with the resilience of the leaves in returning the spring from flexure, the stretch of the rubber permitting the relative movement of the surfaces of the rubber whereby relative movement between the contacting surfaces of the rubber and leaves is avoided.

4. In a spring, the combination of a plurality of leaves free to move endwise relatively to each other; and a rubber insert between the leaves extending throughout the portion of the leaves having relative movement as the leaves are flexed, each surface of the rubber insert moving with the surface of the leaf engaged, the stretch of the rubber permitting the relative movement of the surface of the rubber whereby the relative movement between the contacting surfaces of the rubber and the leaves is avoided.

5. In a spring, the combination of a plurality of leaves free to move endwise relatively to each other; and a rubber insert between the leaves, the rubber being secured to opposing adjacent surfaces of the leaves.

6. In a spring, the combination of a plurality of leaves free to move endwise relatively to each other; and a rubber insert between the leaves, the rubber being secured to opposing adjacent surfaces of the leaves by vulcanization.

7. In a spring, the combination of a plurality of leaves, the leaves being clamped together and having their free ends free to move relatively to each other; and a rubber insert between the leaves extending from the free end toward the clamp, the surface of the rubber insert moving with the surface of the leaf engaged, the stretch of the rubber permitting the relative movement of the surface of the rubber whereby the relative movement between the contacting suraces of the rubber and the leaves is avoided.

8. In a spring, the combination of a plurality of leaves, the leaves being clamped together and having their free ends free to move relatively to each other; and a rubber insert between the leaves extending from the free end toward the clamp, said rubber insert being secured to opposed adjacent surfaces of the leaves, whereby the stretch of the rubber will permit the relative movement of the surfaces of the rubber and avoid relative movement between the contacting surfaces of the rubber and the leaves.

9. In a spring, the combination of a plurality of leaves, the leaves being clamped together and having their free ends free to move relatively to each other; and a rubber insert between adjacent leaves extending from their free ends toward the clamp, the rubber being of a thickness gradually reducing toward the clamp.

10. In a spring, the combination of a plurality of leaves, the leaves being clamped together and having their free ends free to move relatively to each other; and a rubber insert between the leaves extending from the free end toward the clamp, the rubber being of a thickness gradually reducing toward the clamp, the decrease in thickness approximating the decrease in movement of the leaves toward the clamp.

11. In a spring, the combination of a plurality of leaves, the leaves being clamped together and having their free ends free to move relatively to each other; and a rubber insert between the leaves extending from the outer end to within the clamp.

12. In a spring, the combination of a plurality of leaves, the leaves being clamped together and having their free ends free to move relatively to each other; and a rubber insert between the leaves extending from the outer end to within the clamp, the rubber being of a thickness gradually reducing from the free end to within the clamp.

13. In a spring, the combination of a plurality of leaves free to move endwise relatively to each other at one end; and rubber inserts between the leaves engaging opposing surfaces of the leaves, the inserts at opposite sides of the leaves extending over the end of the leaves and being secured together.

14. In a spring, the combination of a plurality of leaves free to move endwise relatively to each other at one end; and rubber inserts between the leaves engaging opposing surfaces of the leaves, the inserts at opposite sides of the leaves extending around the sides of the leaves and being joined together.

15. In a spring, the combination of a plurality of leaves free to move endwise relatively to each other at one end; and rubber inserts between the leaves engaging opposing surfaces of the leaves, said rubber inserts being joined at the ends and sides of the leaves.

16. In a spring, the combination of a plurality of leaves free to move relatively to each other, the opposing surfaces of the leaves having rubber faces secured thereto and the rubber faces of opposing leaves being detachably secured together.

17. In a spring, the combination of a plurality of leaves free to move relatively to each other, the opposing surfaces of the leaves having rubber faces secured thereto by vulcanization and the rubber faces of opposing leaves being detachably secured together.

18. In a spring, the combination of a plurality of leaves, said leaves being free to move relatively to each other as the spring is flexed, the opposing surfaces of the leaves having rubber faces secured to the leaves, the rubber faces at opposite sides of the same leaf being joined together.

19. In a spring, the combination of a plurality of leaves, said leaves being free to move relatively to each other as the spring is flexed, the opposing surfaces of the leaves having rubber faces secured to the leaves, the rubber faces at opposite sides of the same leaf being joined together at the ends and sides of the leaf.

20. In a spring, the combination of a plurality of leaves free to move endwise relatively to each other; and a rubber insert between the leaves, the rubber being stretched by the relative movement of the opposing surfaces of the leaves, the neutral point of the rubber varying from the neutral point of the spring, the stretching of the rubber resisting the movement of the spring leaves toward their neutral position to decrease the rebound of the spring.

21. In a spring, the combination of a plurality of leaves free to move endwise relatively to each other; and a rubber insert between the leaves, the rubber being secured to the surfaces of the opposing leaves and stretched by the relative movement of the opposing adjacent surfaces of the leaves, the neutral point of the rubber varying from the neutral point of the leaves to stretch the rubber with a movement of the leaves toward their neutral position whereby the rubber decreases the rebound of the spring.

22. In a spring, the combination of a plurality of leaves forming a plurality of spaces between said leaves, said leaves being free to move endwise relatively to each other; and rubber inserts between said leaves, the sides of said inserts extending around the edges of the leaves enclosing the leaves, said rubber being secured to said surfaces and stretched by the relative movement of the opposing adjacent surfaces of the leaves, the neutral point of the rubber differing from the neutral point of the leaves to stretch the rubber against a movement of the leaves toward their neutral position whereby the rubber tends to decrease the rebound of the spring.

23. In a spring, the combination of a plurality of leaves free to move endwise relatively to each other; and a rubber insert between the leaves, the rubber being stretched by the relative movement of the opposing leaves and having its neutral point differing from the neutral point of the spring leaves to stretch the rubber in both directions from said neutral position in the complete flexing of the spring whereby the stretching of the rubber will add to the strength of the spring as it is flexed under load and will resist the flexure of the springs toward their neutral position past the neutral position of the rubber on the rebound.

24. In a spring, the combination of a plurality of leaves free to move endwise relatively to each other; and a rubber insert between the leaves, the rubber being secured to and stretched by the relative movement of the opposing adjacent surfaces of the leaves, the neutral point of the rubber differing from the neutral point of the spring leaves and being intermediate the complete flexure of the leaves to stretch the rubber in a flexure of the spring under load whereby the rubber tends to strengthen the spring and to stretch the rubber on a reverse movement of the spring leaves whereby the rubber snubs the rebound of the spring.

In testimony whereof I have hereunto set my hand.

HUGH C. LORD.